United States Patent [19]

Troetscher et al.

[11] 4,036,762
[45] July 19, 1977

[54] WIRELESS REMOTE-CONTROL SYSTEM FOR A CAMERA OR THE LIKE

[75] Inventors: Otto Troetscher, Aalen; Erwin Wiedmann, Essingen; Horst Stahl, Oberkochen; Helmut Forberich, Bad Kreuznach, all of Germany

[73] Assignee: Carl Zeiss-Stiftung, Wurttemberg, Germany

[21] Appl. No.: 613,426

[22] Filed: Sept. 15, 1975

[30] Foreign Application Priority Data

Sept. 17, 1974 Germany .................. 2444355

[51] Int. Cl.² .................. H04B 9/00; H04B 1/06
[52] U.S. Cl. .................. 250/199; 358/114; 325/308
[58] Field of Search .................. 250/199; 178/DIG. 15; 325/308; 354/22, 36, 38, 48, 50, 266; 358/105, 110, 112, 113, 125, 210

[56] References Cited

U.S. PATENT DOCUMENTS

| 2,506,672 | 5/1950 | Kell | 250/199 |
| 3,475,092 | 10/1969 | Harvey | 250/199 |
| 3,657,543 | 4/1972 | Rose | 250/199 |
| 3,866,177 | 2/1975 | Kawamata | 250/199 |
| 3,906,366 | 9/1975 | Minami | 250/199 |
| 3,928,760 | 12/1975 | Isoda | 178/DIG. 15 |
| 3,937,949 | 2/1976 | Ishikawa | 250/199 |

Primary Examiner—Robert L. Griffin
Assistant Examiner—Michael A. Masinick
Attorney, Agent, or Firm—Hopgood, Calimafde, Kalil, Blaustein & Lieberman

[57] ABSTRACT

The invention contemplates wireless remote-control of a camera or the like, as from within the field of view of the camera, and using control radiation which is essentially outside the spectral response of the camera. Control is effected by selective operation of a pulsed transmitter of the control radiation, and by generating in a receiver at the camera an electrical signal for camera control. Various modifications and embodiments are disclosed, including selective remote-control of one or more different camera functions.

7 Claims, 9 Drawing Figures

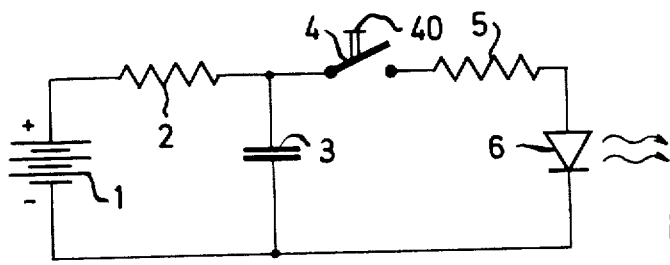
Fig.1
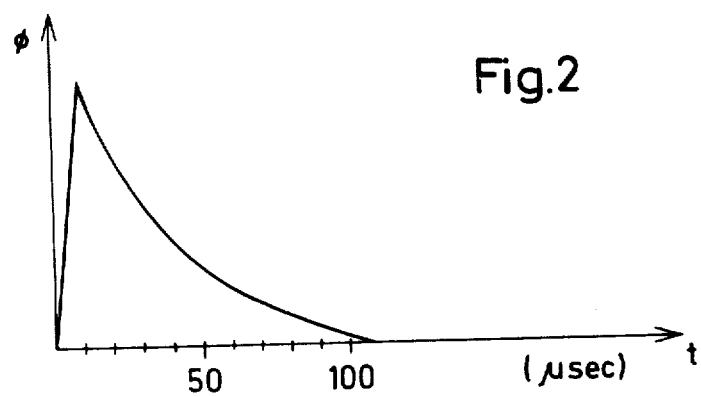
Fig.2
Fig.3
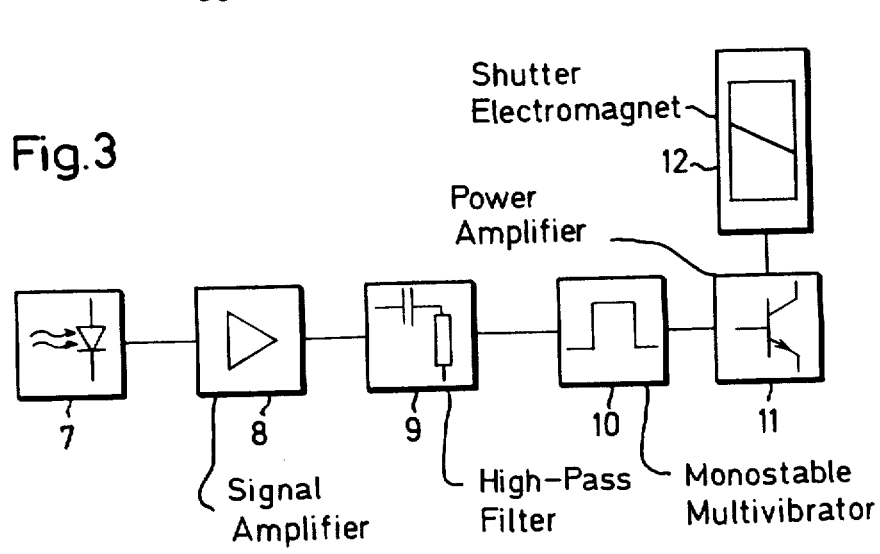

WIRELESS REMOTE-CONTROL SYSTEM FOR A CAMERA OR THE LIKE

The present invention relates to a device for the wireless remote control of switching and movement operations in cameras or other equipment.

Devices of the type indicated for wireless remote control are used for remotely actuating electrical switches on equipment and for the control of movements such as occurring, for instance, when opening and closing garage doors, switching-on and off film cameras, actuating a zoom lens, changing diaphragm settings, and focusing projectors, or when operating model railways and automatic toys.

The prior art remote controls transmit the signals by means of radio waves or supersonic waves. Radio-control transmitters and receivers are relatively expensive and both require suitably designed antennas. Generally, radio control equipment is subject to governmental regulations involving approvals and fees. The allocated frequencies generally only apply to one country. Ultrasonic remote controls also requires a relatively great complexity of electronic apparatus and a relatively great requirement of space and energy. Therefore, such prior art devices are not suited for the remote control of cameras and other small equipment, which is necessarily restricted as to bulk and whose manufacture is subject to a tight calculation of costs.

It is an object of the present invention to provide a remote-control device which is simple to realize technically, while being space- and energy-saving, which is moreover substantially insensitive to interfering signals, but so sensitive to the transmitted signal that an accurate adjustment by the transmitter to the receiver can be dispensed with.

Another object is to achieve the foregoing object without radio techniques or apparatus and, in the case of remote-camera operation, it is an object to avoid using control radiation within the spectral response of the camera.

According to the present invention these objects are solved by using a pulse-like emitting radiation source as transmitter and an element converting the radiation energy to electric energy as receiver, the electric signal at the receiver being used for control of the camera or the like.

Advantageously, a luminescence diode emitting in the infrared with a control circuit is used as transmitter, and a photo-diode with amplifier is used as receiver.

To suppress extraneous light, an edge filter or an interference filter is advantageously mounted in the path of the control radiation.

To increase the range of transmission of the transmitter a focusing of the emitted radiation is considered advantageous. Focusing can be effected by means of mirrors or optical lenses.

In a camera, the receiver is advantageously mounted at the location of the optical system at which also photodetectors for exposure meters are to be mounted. Since, at this location, the entrance pupil of the objective is imaged, an increase in the illuminance in relation to the surfaces of entrance pupil-to-receiver is obtained. Advantageously, the receiver includes an amplifier of high-pass performance, allowing only the high frequencies contained in the rising or falling side of the pulse to be utilized.

For the remote control or initiation of several functions, the invention permits transmission of several coded signals and their decoding in the receiver for control-signal output appropriate to the desired control function.

The particular advantages of the invention are that the transmiter and receiver can be realized with few electronic components, that they have a low energy consumption, that interfering signals can be suppressed by simple means such as, for instance, by the introduction of filters in the path of rays, and that the mechanical dimensions of transmitter and receiver are selected so small that they can also be used for the remote control of small equipment, such as model railways or cameras. A further advantage resides in the fact that the spectral sensitivity of the used photodiode can be selected so that its maximum is close or substantially corresponds to the maximum or the radiation emitted by the used luminescence diode. Thereby, extraneous light can easily be eliminated by optical filters while the sensitivity of the photodiode to the transmitted signal is so great that no exact bearing need be taken with the transmitter.

An illustrative embodiment of the present invention will now be described more fully with reference to the accompanying drawings, in which:

FIG. 1 illustrates the circuit diagram of a luminescence diode used as transmitter;

FIG. 2 is the curve as related to the time of the radiation pulse emitted by the transmitter;

FIG. 3 is the block diagram of a receiver according to the present invention in a camera with electronic shutter;

Figure 4:
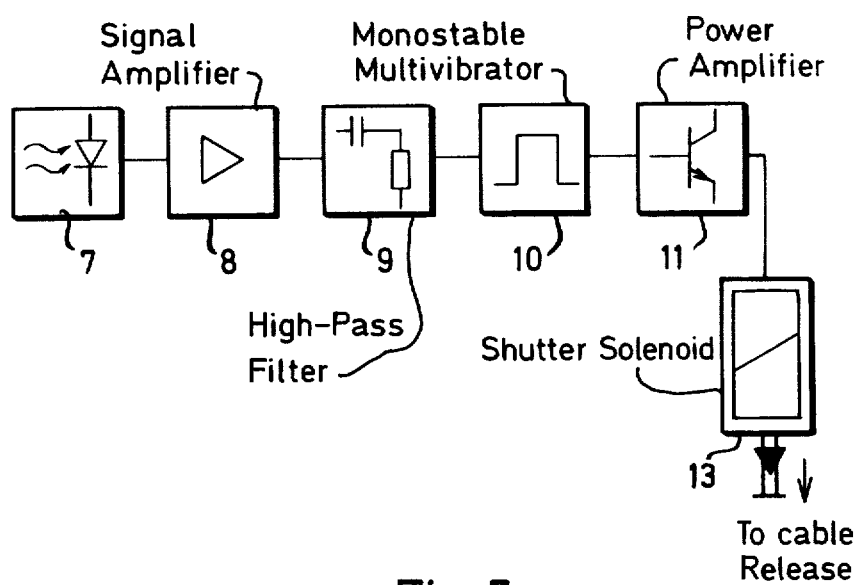
FIG. 4 is a block diagram of a receiver in a camera with mechanical shutter.

In FIG. 1, reference numeral 1 designates a battery which charges a capacitor 3 via a resistor 2. When a switch 4 is closed by actuation of a key 40, the capacitor 3 discharges in a relatively short period of time via a protective resistor 5 and a luminescence diode 6, such as a GaAs diode. The current pulse discharged from capacitor 3 is converted to a steep radiation pulse by the luminescence diode.

FIG. 2 illustrates the curve as related to time of the radiation pulse emitted by the luminescence diode. The GaAs diode used in the illustrated embodiment emits in the infrared range and reaches its maximum radiation intensity after approximately 10$\mu$sec. Thus, for use in remote control of a camera having a conventional spectral response in the visible region, the pulsed operation of a GaAs diode will not affect the normal photographic operation of the camera, even if the transmitter of FIG. 1 is in the field of view of the camera.

FIG. 3 illustrates the block diagram of a receiver in accordance with the present invention as used for controlling an electronic camera shutter. In cameras of this type, a tensioned shutter is released by actuation of an electromagnet. In the illustration of FIG. 3, reference numeral 7 designates a photo-diode which receives a radiation pulse emitted by a transmitter according to FIG. 1, the radiation pulse being thereby converted to an electric pulse. The electric pulse is amplified in an amplifier 8. Reference numeral 9 designates a high-pass filter which only allows the high frequencies contained in the rising side of the pulse to be transmitted. The high-pass filter 9 is followed by a monostable multivibrator 10 which generates a control pulse of sufficient duration from the high frequencies of the rising pulse side; the control pulse then actuates the electromagnet 12 of the camera shutter via a power amplifier stage 11.

In the embodiment of FIG. 4, a similar receiver is used for the actuation of a mechanical camera release, and stages 7 to 11 are the same as stages 7 to 11 in the embodiment of FIG. 3. In FIG. 4, however, the power stage 11 controls a solenoid which converts the electric pulse to a mechanical movement by which the tensioned shutter of the camera can be released, for instance, via a wire-cable release.

Figure 5:
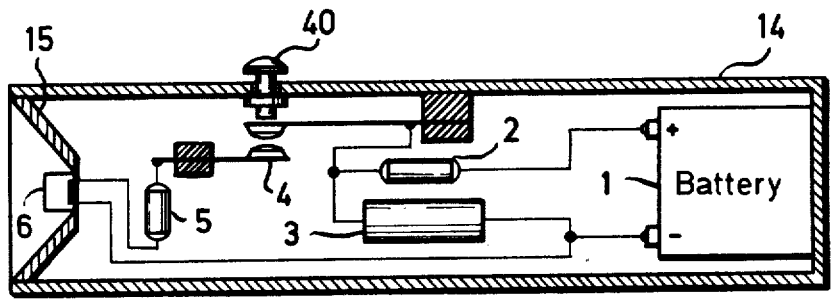
FIG. 5 is a longitudinal section through an embodiment of a transmitter according to the present invention.

The sectional drawing of FIG. 5 shows a transmitter of the invention, wherein a housing 14 includes a reflector 15 to focus the emitted radiation. The other reference numerals correspond to those of the block diagram of FIG. 1. Thus, again, reference numeral 1 designates a battery, reference numeral 2 a resistor, reference numberal 3 a capacitor, reference numeral 4 a switch with the associated key 40, reference numeral 5 is a protective resistor, and reference numeral 6 a luminescence diode. Instead of the reflector 15, the luminescence diode 6 could be preceded by an optical lens (not shown). Reflector or optical lens are used to focus the emitted radiation and therewith to increase the range of transmission of the transmitter.

Figure 6:
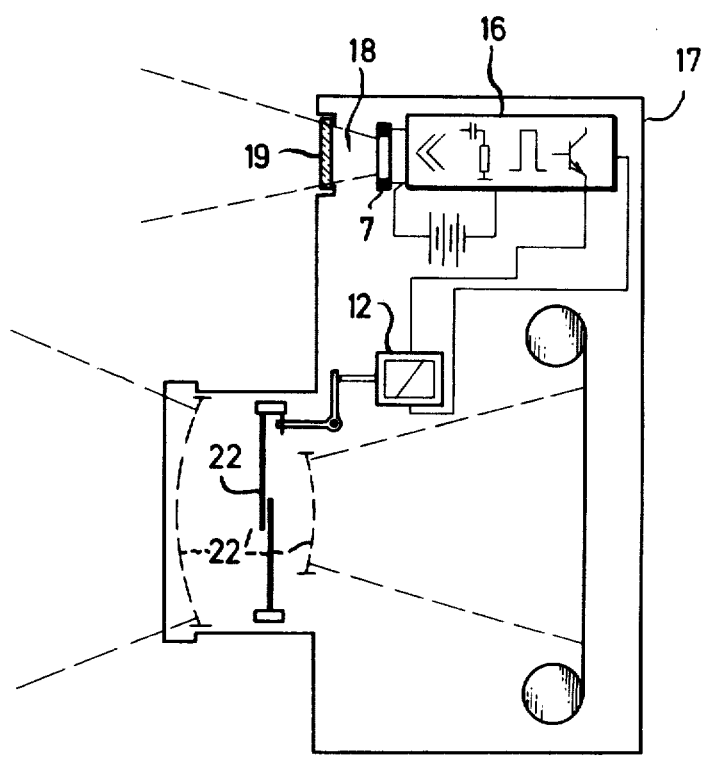
FIG. 6 is a section through a camera with electronic shutter into whose housing a receiver in accordance with the present invention is integrated.

FIG. 6 illustrates an application of the device according to the present invention for the remote release of a camera with an electronic shutter 22, shown mounted between elements of a multiple-element objective suggested at 22'. The receiver of the device is integrated into the camera housing 17. The releasing magnet 12 for the shutter 22 is controlled by a receiver circuit 16, corresponding to the circuit shown in FIG. 3. The photodiode 7 is offset in the camera housing 17 so that false light may be eliminated by a focusing hood 18. The geometric dimensions of the focusing hood may, for instance, be selected such that the aperture angle for the receiver diode corresponds to the aperture angle of the photoobjective. And a filter 19, mounted at hood 18 and in the path of radiation incident upon diode 7, may be designed as an edge filter or as an interference filter, the same being used to suppress extraneous light. Alternatively, it will be understood that the photodiode could also be arranged in the optical path of rays of the camera, so that it obtains the transmitted pulse through the objective 22'.

Figure 7:
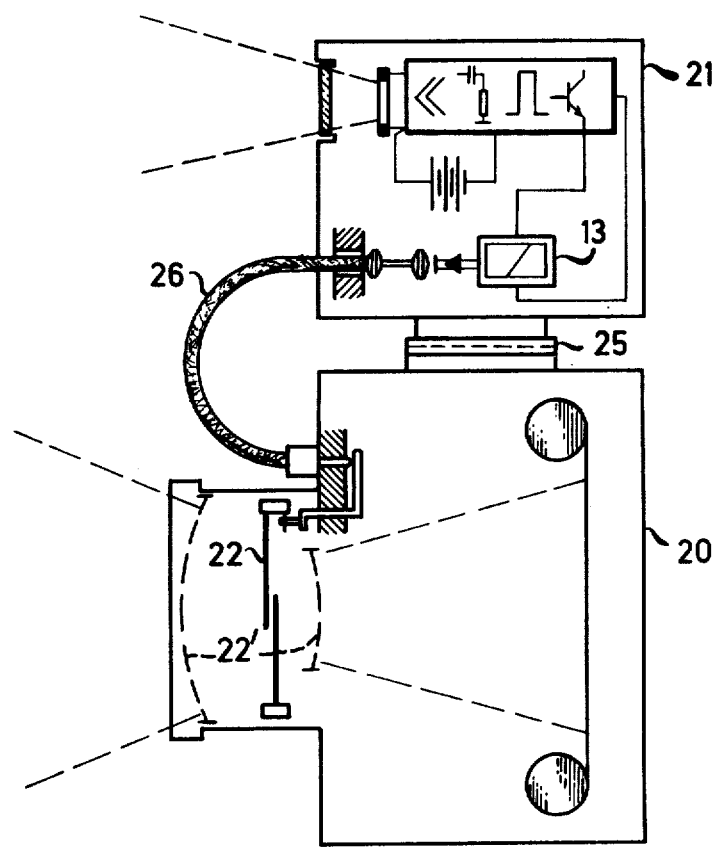
FIG. 7 is a section through a camera with mechanical shutter which is connected with a receiver according to the present invention via a plug and socket connection and a wire release.

FIG. 7 shows application of a device of the invention for the remote release of a camera having a mechanical shutter. The camera and a receiver of the invention are interconnected via a plug-and-socket connection 25 and a wire or cable release 26. Upon detection of a transmitted signal, the receiver actuates the wire release 26 via a solenoid 13, which releases the tensioned shutter 22.

Figure 8:
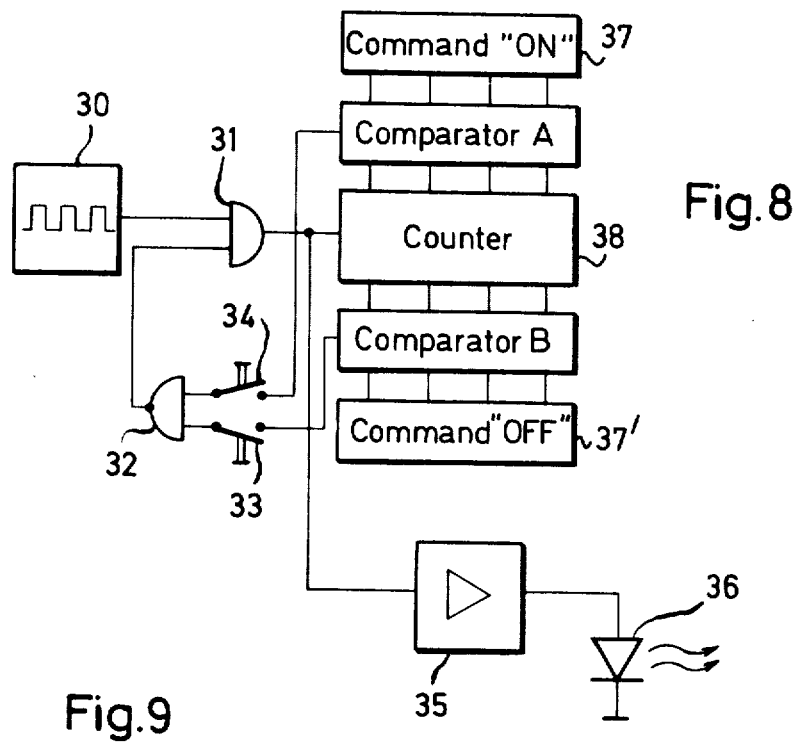
FIG. 8 is a block diagram of a device for the initiation of several operations with a transmitter according to the present invention.

The block diagram of FIG. 8 illustrates a circuit for the selective transmission of a plurality of different control transmissions, for reception and separate utilization by means to be described in connection with FIG. 9. In FIG. 8, a freerunning multivibrator 30 generates pulses which are passed to an AND-gate 31. This gate 31 is blocked since the second input of the gate is connected with the output of a NAND-gate 32. This output connects to "0", since both inputs connect to "L", when the keys 33 and 34 are not depressed. Now, if one of the keys is depressed, for instance, the key 34, then the corresponding input of the NAND-gate 32 becomes "0", since the output of a comparator A connects to "0", if the counter reading does not correspond to the nominal value. By way of example, the command for an "ON" function may be set or programmed at 37 to a pulse sequence of ten, while the command for an "OFF" function is programmed at 37' to a pulse sequence of twenty. In its initial position, a counter 38 is set to zero. After depressing the key 34, the output of gate 32 becomes "1" and the pulses can be fed into the counter via gate 31. After ten pulses, the counter reading corresponds to the set or command value, and the output of comparator A changes to "1", thereby blocking gate 31 via NAND-gate 32. By this process, ten pulses are received at the input of counter 38, and these pulses are amplified in the amplifier 35 which controls the transmitting diode 36, thus transmitting a succession of ten radiation pulses. In similar fashion, if key 33 is depressed, the transmitting diode is governed by the "OFF" command program at 37' and by comparator B to transmit a succession of twenty radiation pulses.

Figure 9:
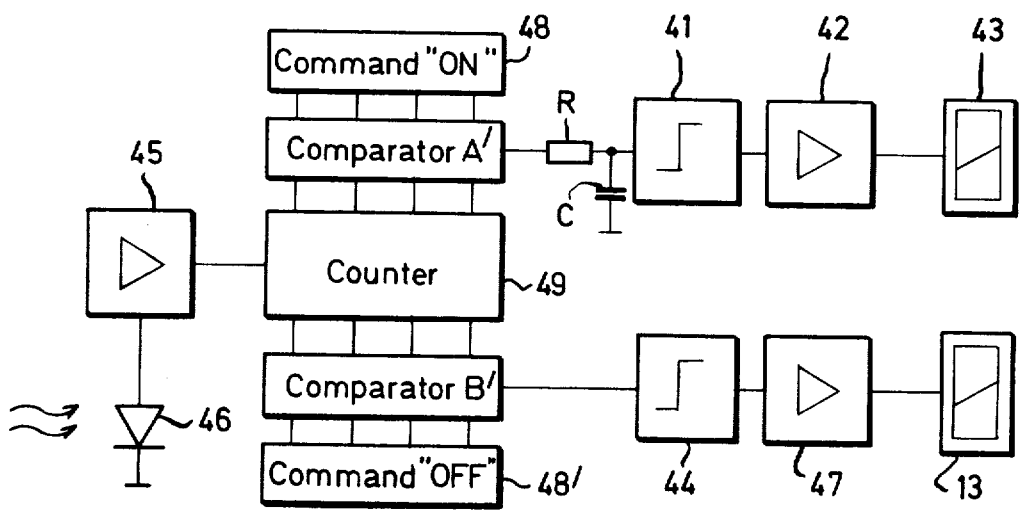
FIG. 9 is a block diagram of a receiver for several operations.

In the block diagram of FIG. 9, a photo-diode 46 receives the pulses from the transmitter circuit of FIG. 8. Photo-diode 46 converts the received pulses to electric pulses, which are supplied to an amplifier 45 and then fed to a counter 49. In its initial position, counter 49 is set to zero. The function "ON" is assumed to be programmed at 48 to ten, while the function "OFF" is programmed at 48' to twenty. If key 34 has been depressed in the transmitter, a succession of ten pulses is received and fed into counter 49, and the output of a comparator A' changes form "0" to "1", the output of a Schmitt-trigger 41 also changing to "1"; whereupon, via an amplifier 42 an electromagnet 43 is actuated to turn "ON" or initiate a given operation. On the other hand, if key 33 is depressed in the transmitter, a succession of twenty pulses will be fed to the receiver of FIG. 9, and after twenty pulses a different electromagnet 13 is actuated, via a separate Schmitt-trigger 44 and amplifier 47, to switch or turn "OFF" the operation. In the upper portion of the circuit diagram, an RC network is provided between comparator A' output and trigger 41 input to suppress the short 0-1-0 pulse which is developed when counter 49 counts beyond ten, i.e., to twenty; the RC network thus avoids any decoding ambiguity and assures correct receiver interpretation of the desired one of the plural commands.

What is claimed is:

1. A wireless system for the remote control of a camera or the like, said camera or the like having a response to radiation of a first spectral character within a predetermined field of view, said system comprising a pulse-generating transmitter of radiation of second spectral character essentially outside said first special character said transmitter including means for the selective control of pulsed radiation thereform, and a receiver having a maximum spectral response substantially matched to the output of said transmitter, said receiver producing an electrical-output camera-control signal in response to detected pulse radiation from said transmitter, and said receiver including means for directionally focusing the received radiation and for fixedly mounting the same to a camera in substantial alignment with the field of view of the camera, the last-defined means establishing for said receiver a field of view of substantially the same angular dimensions as those of said camera field of view, whereby the camera may be remotely controlled upon operation of the transmitter from within the camera field of view.

2. The system of claim 1, in which said transmitter includes means for directionally focusing the radiation from said transmitter.

3. The system of claim 1, in which said receiver includes a high-pass amplifier.

4. The system of claim 1, in which said transmitter includes a luminescence diode emitting in the infrared region, and control-circuit means for selectively pulsed operation of said diode; and in which said receiver includes a photodiode and amplifier means connected to said photodiode.

5. The system of claim 4, in which the maximum radiation response of said luminescence diode and the maximum spectral snesitivity of said photodiode substantially correspond to each other.

6. In combination, a photographic camera including a shutter and actuating means therefor and having a response to radiation of a first spectral character within a predetermined field of view, and a wireless system for the remote control of said shutter; said system comprising a pulse-generating transmitter of radiation of second spectral character outside said first spectral character, said transmitter including means for the selective control of pulsed radiation therefrom, and a receiver responsive to the spectral output of said transmitter, said receiver being operatively connected to said shutter-actuating means and producing a shutter-actuating signal in response to detected pulse radiation from said transmitter, said receiver being fixedly mounted to said camera and including means directionally limiting the response to said receiver to substantial coincidence with the field of view of said camera, whereby the camera may be remotely controlled upon selective operation of the transmitter without having the resulting photograph show a response to transmitter radiation.

7. The system of claim 6, in which said transmitter includes first and second coded-pulse control circuits, and means for selectively operating one to the exclusion of the other of said circuits; and in which said receiver includes pulse-decoding means producing separate electrical-output signals depending upon the particular detected one of said coded-pulse control circuits which has been selectively operated, the connection of said receiver to said shutter-actuating means being such that one to the exclusion of the other of said output signals is operative upon said shutter-actuating means.

* * * * *